United States Patent Office 3,533,713
Patented Oct. 13, 1970

3,533,713
ROTOR LOCKING DEVICE
Moises Salmun, Woodland Hills, Calif., assignor to Lockheed Aircraft Corporation, Burbank, Calif.
Filed Apr. 1, 1968, Ser. No. 717,800
Int. Cl. B64c 27/52
U.S. Cl. 416—140                                              6 Claims

ABSTRACT OF THE DISCLOSURE

A lock arm comprising a spring actuated double pawl having an upper and a lower bearing surface. The upper bearing surface contacts the hub of a rotor at low r.p.m., thus causing the rotor to lock into stationary position; the lower bearing surface engages the hub at normal operating r.p.m. and prevents it from tilting beyond a maximum teeter angle. The locking arm is actuated by centrifugal force acting upon it to disengage it from the rotor hub. It is urged into a locking position by a spring which at low r.p.m. overcomes the centrifugal force upon the arm. A lock arm is used adjacent each blade of a rotor.

BACKGROUND OF THE INVENTION

Field of the invention

This invention relates to a device for locking into position a rotating member and for preventing the member from tilting beyond a maximum predetermined angle from its horizontal axis. More particularly, this invention relates to a locking device for a rotor, which locking device when actuated prevents the rotor from rotating or vibrating while an aircraft is in motion and which locking arm at a predetermined r.p.m. of the rotor blades prevents the rotor from tilting beyond a predetermined angle from its centered position.

Description of the prior art

Advanced state of the art aircraft design has recently evolved tactical aircraft whose forward motion is supplied by propellers and which in addition require rotors as stabilizers and rudders. The unique problem presented is that while such an aircraft is in forward motion it is necessary, when the rotor is not in use, to lock the rotor into position so that the edges of the rotor blades are parallel with forward motion of the aircraft and thus offer the least possible resistance to the airstream. The rotor must also be locked into a stationary position to prevent vibration of the hub and blades when they are subjected to a high velocity airstream. An additional problem that has arisen with respect to such rotors is that, as with most rotors, they are designed to tilt freely up to a certain angle from their centered position axis; this angle is generally termed a teeter angle and the rotating hub must be prevented from exceeding a predetermined maximum teeter angle. Prior art devices solve only the problem of locking a stationary rotor into position on a grounded aircraft. Such devices merely comprise fixed blocks which engage the blades of a rotor to prevent blade droop.

Accordingly, it is a primary object of the present invention to provide a mechanism for locking a stationary rotor into position on a moving aircraft and for preventing the rotor from tilting beyond a maximum teeter angle from its horizontal axis when it is at operational r.p.m.

It is another object of the present invention to provide a spring actuated locking arm to engage the hub of a rotor and to prevent its rotation or tilting.

Yet another object of the present invention is to provide a spring actuated locking arm which has an upper bearing surface and a lower bearing surface and wherein the upper bearing surface cooperatively engages and locks a rotating member into a stationary position and the lower surface cooperatively engages a rotating member at a predetermined r.p.m. and prevents the member from tilting beyond a maximum angle from the horizontal.

Yet another object of the present invention is to provide a locking mechanism for a rotating member, which locking mechanism is caused to engage the rotating member by a biasing means which is actuated by a decrease in centrifugal force, and which arm is caused to disengage the rotating member when the centrifugal force on the arm exceeds a predetermined value.

Another object of the present invention is to provide locking arms so that the hub of the rotor is engaged at any one of a plurality of locations and is thereby locked into position.

SUMMARY OF THE INVENTION

In one of its broadest aspects, as applied, say, to a thrust generating device, this locking arm comprises support means having a base, the support means being connected at its base to the drive means of a rotating member. An arm means having a fixed end and an oscillating end and having pawl means extending from adjacent the fixed end is rotatably connected at the fixed end to the support means. The pawl means are adapted to cooperatively engage a rotating member at predetermined positions of the arm means. A biasing means having a fixed end and a movable end and having a compressed position and extended positions is connected at the fixed end to the support means. The biasing means is adapted to extend and to cooperatively engage the arm means and to urge the pawl means into a contact position with a rotating member at predetermined centrifugal force values acting upon the arm.

As the drive shaft of the rotating member rotates, the arm means connected to the support means is also caused to revolve and a centrifugal force is exerted upon the oscillating end of the arm means, forcing it away from the support means and causing its fixed end to engage and comprises the biasing means. The greater the rate of revolution of the revolving member, the greater the centrifugal force that is exerted upon the oscillating end of the arm member and the greater the degree of compression of the biasing means. As the revolutions per minute of the revolving member are decreased, so the centrifugal force upon the arm member is decreased, thereby allowing the biasing means to become extended. In this position, the biasing means urges the oscillating end of the arm towards the support member, thus causing pawl means to engage the revolving member.

The invented torque locking arm is automatically actuated by exerting a centrifugal force upon the oscillating end of an arm member. The centrifugal force is in turn determined by the rate of revolution of the revolving member. At a second extended position of the biasing means the pawl means engages the rotating member at such a position that the rotating member is prevented from tilting beyond a maximum allowable teeter angle from its horizontal axis. Thus, the invented device is highly advantageous in that it is automatically positioned in contrast to prior art devices which are set in fixed positions to engage and to lock rotating members. The present device is adapted to be used to lock a rotor on a moving aircraft and to maintain the rotor in a minimum air drag position relative to the forward motion of the aircraft.

The novel features which are believed to be characteristic of the invention, both as to its organization and method of operation, together with further objects and advantages thereof will be better understood from the

3 following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

DESCRIPTION OF THE PREFERRED EMBODIMENT

Although the invented device may be used to lock a rotating member into position at predetermined operating conditions, it is particularly useful when used to control the movement and teeter angle of a rotor on a moving aircraft and will accordingly be described in connection with such use.

Figure 1:
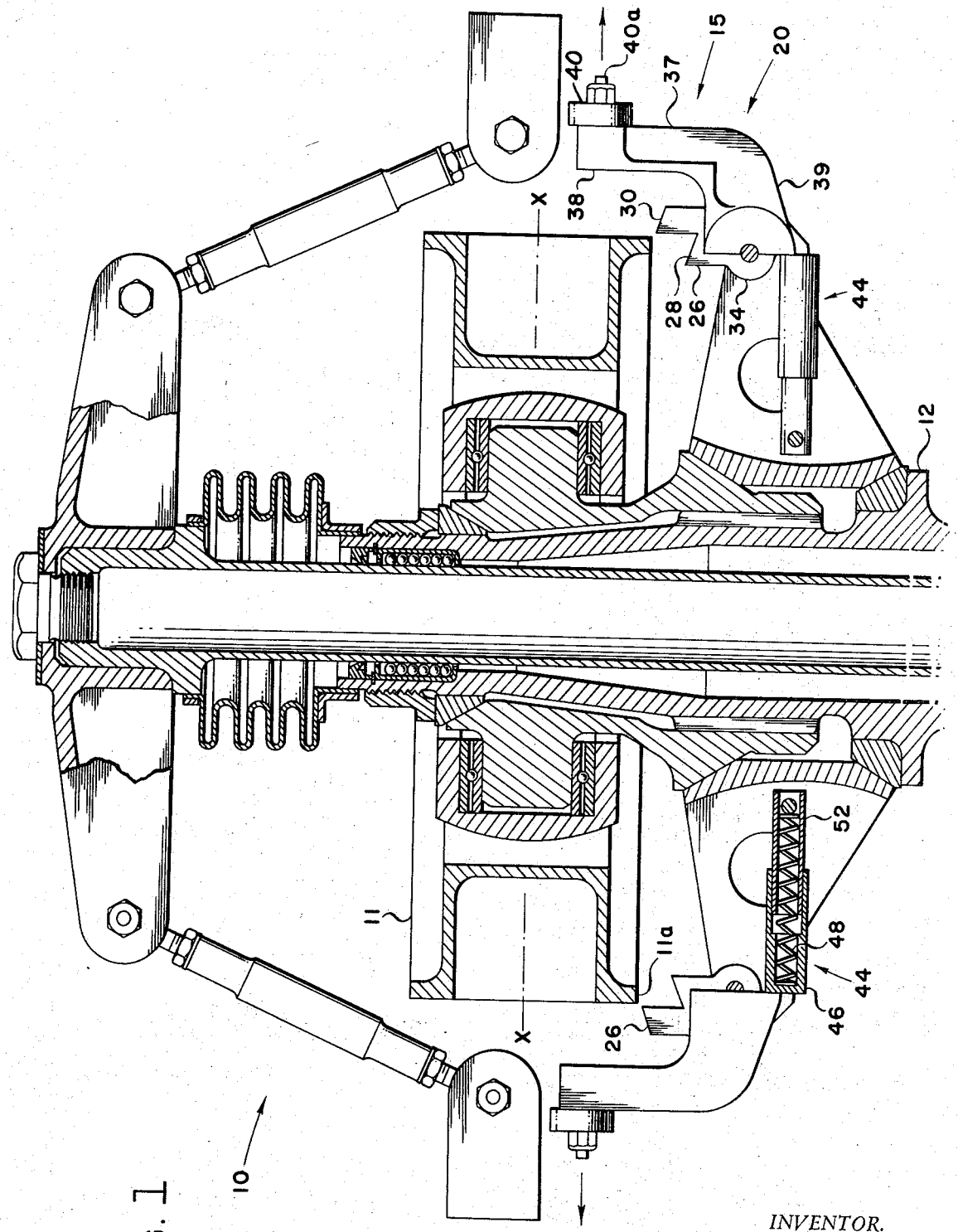
FIG. 1 is a side elevation in partial section of the invented anti-torque locking arm connected to the drive shaft of a rotor at operating r.p.m. with the hub in a non-tilted position.
Figure 2:
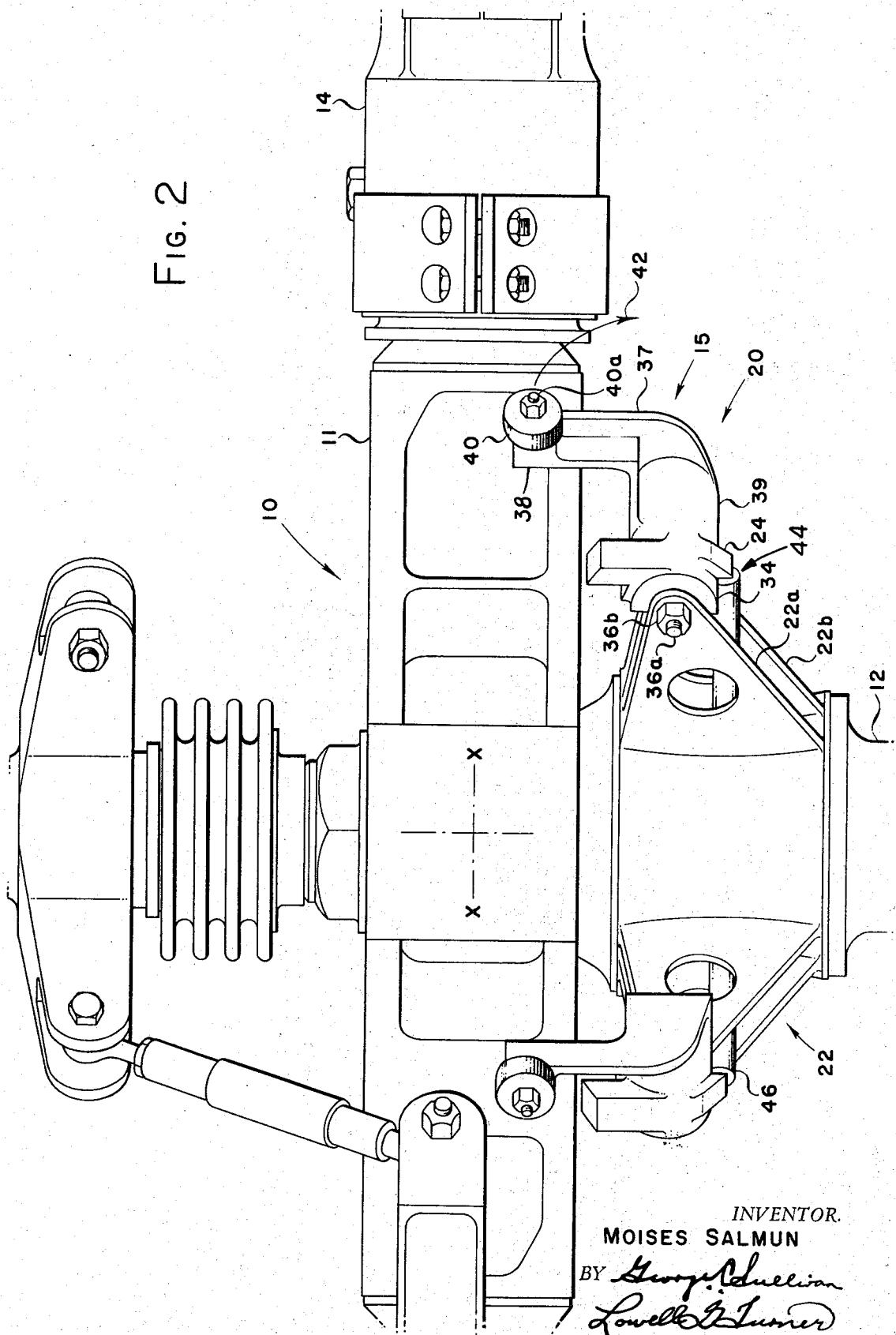
FIG. 2 is an elevational view of the invention on the rotor hub at an operating r.p.m., the hub not being tilted.

With reference now to FIGS. 1 and 2, a rotor assembly 10 is comprised of a drive shaft 12 which is drivingly connected to a gimbal hub 11. A plurality of rotor blades or members 14 are connected to the gimbal hub and rotate therewith. The drive shaft 12 is connected to a prime mover such, for example, as an aircraft engine (not shown). When the rotor on a moving aircraft is not revolving it is locked into a stationary position to minimize air drag and to prevent vibration. When in operation the prime mover rotates the drive shaft 12 in a counter-clockwise direction, thus causing gimbal hub 11 and rotor blades 14 to rotate. The gimbal hub 11 and rotor blades 14 rotate in a plane passing through a centerline designated X—X in FIG. 1. It is a further characteristic of the gimbal hub 11 and rotor blades 14 while rotating to tilt to a maximum angle $\alpha$ (FIG. 4) from the plane of rotation X—X.

Referring again to FIG. 1, there is shown a plurality of locking arm assemblies 15 whose function it is to lock the gimbal hub 11 into a stationary position when not in use and also to prevent the hub 11 from tilting beyond a maximum teeter angle $\alpha$ at operating r.p.m. Since the locking arm assemblies 15 are identical in structure it will suffice to describe only one of them here.

The invented locking arm assembly 15 comprises a support frame 22, a generally crank-shaped or L-shaped arm 20 having a double pawl 26 and a biasing means 44. As best seen in FIG. 2, the support frame 22 comprises two parallel plates 22a and 22b which are generally triangular in shape. The bases of the plates 22a and 22b are fixedly attached to drive shaft 12 for mutual rotation and such that the apexes of the triangular plates extend in a generally perpendicular direction outwardly from the drive shaft. The plates 22a and 22b are attached to the drive shaft parallel to each other and are spaced apart a sufficient distance that a pivotally retained end 34 of the crank arm or locking arm 20 can be inserted therebetween. The apexes of the parallel plates 22a and 22b have a radius of curvature such that one of said plates can fit into a cavity adjacent the pivoted end 34 of the locking arm, as more fully described hereinafter. It is, of course, within the scope of the invention to provide a support frame having different configurations such, for example, as any rigid member having a yoke at the extending end thereof to which the pivoted end 34 of the locking arm 20 can be rotatably connected.

Figure 5:
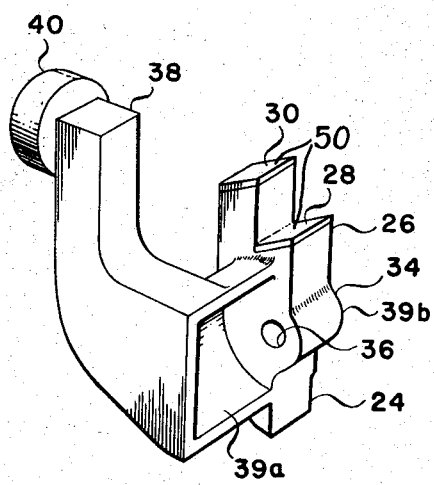
FIG. 5 is a perspective of the locking arm taken generally along line 5—5 of FIG. 1.

Referring specifically now to FIGS. 1 and 5, the locking arm 20 comprises a generally L-shaped member having a first end 34 pivoted to the support frame 22 and a free, oscillating end 38. The upwardly extending portion 37 of the crank is a beam having two sides at right angles, although other shapes could obviously be used, and culminating at the oscillating end 38. The portion 39, usually oriented horizontally, of the L-shaped member has a cavity 39a therein and an opposite solid portion 39b. A bolt-receiving bore 36 passes axially through the solid portion 39b. Integral with and extending upwardly from the solid portion 39b is a double pawl member 26 having two upwardly facing surfaces 28 and 30. Extending downwardly from the solid portion 39b is a spur member 24. The locking arm 20 is rotatably attached to the support frame 22 at the pivoted end 34 by means of a bolt 36a. The solid portion 39b of the member is inserted between the apexes of spaced parallel plates 22a and 22b, as best shown in FIG. 2, with one of the apexes extending into cavity 39a and the other apex extending exteriorly of the end 34 and over the bolt-receiving bore 36. A bolt is then passed through holes provided therefor in the apex of plate 22a, then through the bore 36 and a hole provided in the apex of plate 22b. A nut 36b is tightened onto the bolt 36a to retain the assembly. With the lock arm 20 so attached to the support frame 22 the double pawl means 26 extends toward the hub 11, and the spur member 24 protrudes from the solid section 39a to a location adjacent a spring means 48, described below. The arm 20 can rotate around the bolt 36a when biased by the spring means 48 or when urged outwardly away from said support frame in a rotational movement by centrifugal force. Attached to the oscillating end 38 of the arm 20 is a mass or weight 40. This mass can be of any suitable weight and can conveniently be about 0.5 lb. It is attached to the oscillating end 38 of the arm 20 by a bolt 40a. It is the function of the weight 40 to provide a centrifugal force moment upon the arm 20 when the drive shaft 12 is rotating, thus causing the oscillating end 38 of the arm 20 to move outwardly away from the hub 11, as shown by the arrow 42 in FIG. 2.

It is to be understood that the lock arm 20 can also be a solid structure of different configuration; the essential feature being its ability to be rotatably attached to a support frame such that it can rotate into a hub engaging position in the absence of any centrifugal force, and that it can unlock when a centrifugal force is exerted upon it.

Figure 3:
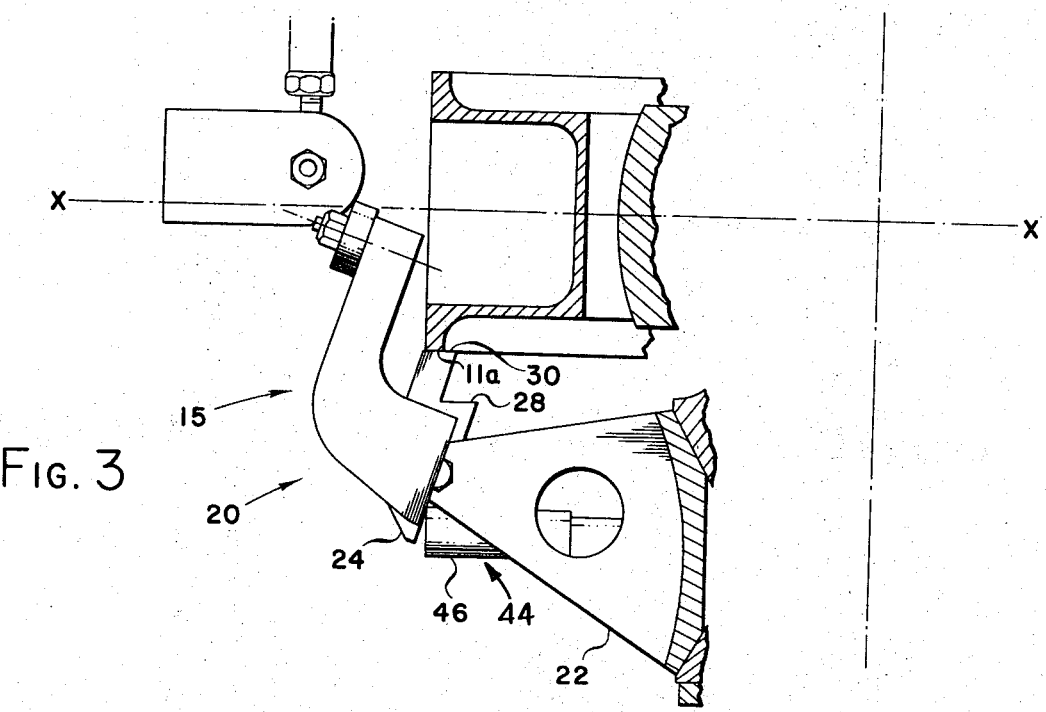
FIG. 3 is an elevation of the locking arm with the spring extended, no centrifugal force being applied and the hub being in the locked position.

Disposed between the parallel plates 22a and 22b is a generally cylindrical telescoping spring cartridge 44 comprising a cylindrical housing 46 which contains longitudinally disposed therein the spring 48. The spring cartridge has its longitudinal axis extending from the base towards the apex of support frame 22 and approximately normal to the axis of shaft 12. The back end 52 of the spring cartridge 44 is fixedly attached to support frame 22 proximate the drive shaft 12. The forward end of the spring 48 and the housing 46 extend to a point beyond the edges of the parallel plates 22a and 22b and into contact with the spur member 24. In its extended position, a closed end of the spring-loaded housing 46 contacts and biases the spur member 24, thus urging the arm 20 and the double pawl 26 rotatively toward the hub 11. In the fully extending position as shown in FIG. 3, the upper face 30 of the pawl 26 cooperatively engages the surface 11a of the hub 11, thus preventing the hub from moving or tilting.

In the fully compressed position, the spring 48 is compressed within cylinder housing 46 by the action of the spur member 24; this compression occurring when a centrifugal force urges the oscillating end 38 of the arm 20 outwardly away from hub 11, causing the arm 20 to rotate around the bolt 36a until spur member 24 compresses the spring 48. In this position, both surfaces of the double pawl are clear of the hub 11, and the hub is free to rotate and to tilt beyond a maximum teeter angle α. This condition is prevalent when hub 11 is rotating at a high r.p.m.

Figure 4:
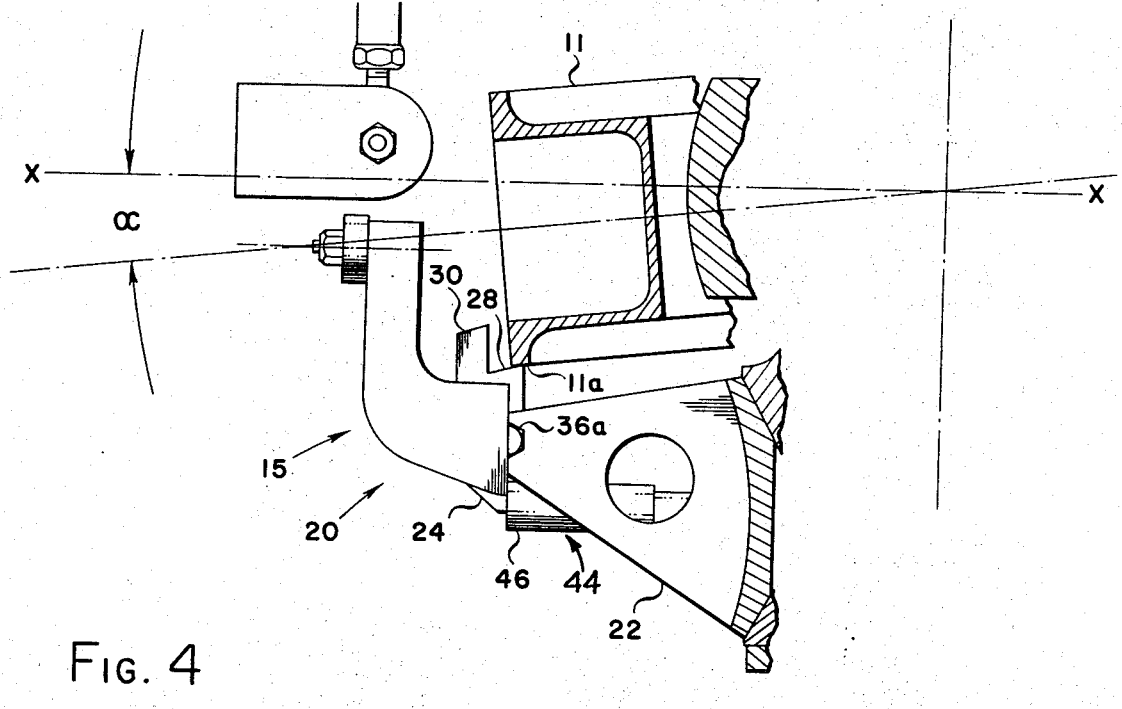
FIG. 4 is an elevation of the device showing the hub tilted at the maximum teeter angle and the spring partially compressed at normal operating r.p.m.

As best shown in FIG. 4, the spring 48 is in a partially compressed position at normal operating r.p.m. In the presently preferred embodiment of the invention, at approximately 900 r.p.m. the spring 48 is compressed such that the lower pawl surface 28 engages the hub 11a. At this r.p.m. centrifugal force causes the oscillating end 38 of the lock arm 20 to rotate outwardly away from the support arm 22, thereby causing the spur 24 to so compress the spring 48. At normal r.p.m. (approximately 900), the hub 11 can tilt at a maximum teeter angle α from its centerline X—X and the surface 11a of the hub is cooperatively engaged by the lower surface 28 of the double pawl. Thus, at normal operating r.p.m., the hub 11 cannot be tilted beyond the maximum angle α. The compressive strength of the spring 48 is calibrated such that at normal operating r.p.m. centrifugal force urges spur member 24 into contact with the spring 48, compressing it to such an extent that the lower surface 28 of the double pawl 26 contacts the hub 11, thereby preventing it from exceeding the maximum teeter angle α. In the extended position, the spring exerts sufficient pressure upon the spur member 24 to cause the lock arm 20 to rotate about the bolt 36a and to place the upper surface 30 of the double pawl in cooperative engagement with surface 11a of the gimbal hub 11.

It is sometimes desirable that the bearing surfaces 11a of the gimbal hub and the surfaces 28 and 30 of the double pawl be covered by a resilient coating, such as illustrated at 50 on bearing surfaces 28, 30 shown in FIG. 5, to prevent chattering of the surfaces and abrasive effects; such resilient surfaces can be cured organic polymers or other impact resistant materials.

In operation, the drive shaft 12, connected to gimbal hub 11, has rotor blades 14 attached thereto. A prime mover such, for example, as an aircraft engine, causes the drive shaft and hence the gimbal hub to rotate in a counterclockwise direction. While the hub is rotating, a centrifugal force is exerted on the oscillating end 38 of the lock arm 20 and upon the weight 40 which is connected to said oscillating end 38. The centrifugal force thus exerted by the revolutions of the rotor forces the end 38 of arm 30 outwardly away from gimbal hub 11, removing the bearing surfaces 30 and 28 of the double pawl 26 away from the bearing surfaces 11a of the gimbal hub 11. At the same time, the spur member 24 compresses the spring 48. At high r.p.m. with no tilting the rotor is free to rotate and the hub 11 makes no contact with either of the locking arm bearing surfaces 28 or 30. However, at high r.p.m., when the gimbal hub 11 tilts, surface 11a is stopped by the surface 28 of the pawl 26. As the rate of revolution of the rotor blades 14 is decreased, the centrifugal force being exerted upon the oscillating end 38 with the weight 40 attached thereto is decreased. The constant force of the spring 48 against the spur member 24 urges the double pawl 26 toward the hub 11 until the rate of revolution and, hence, the centrifugal force acting upon the arm 20 are sufficiently low that the spring 48 forces the upper surface 30 of the double pawl 26 into contact with the hub surface 11a. This occurs when the rotor is stationary and, since there are a plurality of locking arms symmetrically located adjacent the hub 11, the hub is effectively stopped from rotating or from tilting.

Thus, it can be seen that three primary conditions prevail during operation: (1) At high r.p.m. centrifugal force completely disengages the locking arm 20 from the gimbal hub 11; (2) at normal operating r.p.m., centrifugal force is such that the spring 48 urges the arm 20 and thus the lower surface 28 of the pawl into proximity with the gimbal hub 11, allowing said hub to rotate but preventing the hub from tilting beyond a maximum teeter angle α; and (3) below a minimum r.p.m., primarily in a stationary position, the spring 48 forces the bearing surface 30 of the double pawl 26 into contact with the gimbal hub. In this latter position, the rotor blades are positioned with a minimum area toward the direction of movement of the vehicle and they, therefore, offer the least resistance to forward movement. Also in this position, the gimbal hub is completely prevented from any tilting action or from vibrating.

To unlock the rotor, a predetermined minimum number of r.p.m.'s must be achieved. Because of the fact that the drive shaft 12, the support frame 22 and the gimbal hub 11 all rotate together there is no movement of the lock arm 20 relative to the gimbal hub until sufficient centrifugal force is exerted upon weight 40 and oscillating end 38 to cause the lock arm 20 to rotate around bolt 36a and to cause spur 24 to compress spring 48. When this occurs, as has been previously explained, the surfaces of the double pawl move away from the gimbal hub thereby unlocking it.

It is apparent from the foregoing that the invented locking arm is highly advantageous and that it allows the automatic engaging of a rotor hub while the hub is stationary and is located within the high velocity airstream of a moving aircraft. This is in contrast to prior art devices which simply lock the rotor hubs of stationary aircraft to prevent blade droop. A further advantage of the invented device and the significant feature of the invention is that at predetermined r.p.m. a stop surface can be automatically located adjacent a rotating member such that a maximum tilt angle will not be exceeded by the rotating member. The device is simple to install, can be forged or cast to provide maximum impact strength and is light weight. With the invented device, the stationary rotor blades of a moving aircraft can be locked into a position to reduce air drag and to prevent undue vibration. At a different set of operating conditions, the device is automatically actuated by a decrease or increase in centrifugal force and prevents the rotor hub of the revolving rotor assembly from tilting.

Although this invention has been disclosed and illustrated with reference to particular applications, the principles involved are susceptible of numerous other applications which will be apparent to persons skilled in the art.

What is claimed is:

1. In a thrust-generating device such as a tail rotor mounted for generating an opposing torque or the like, and means for rotating said device,
   an arm means for limiting the teetering position of said device as it rotates comprising in combination,
   support means fixedly attached to said rotating means and extending radially outwardly therefrom,
   a generally L-shaped arm having a horizontal portion rotatably connected to said support means and a generally vertical portion constituting a movable end responsive to centrifugal force,
   pawl means arranged in parallel relationship with said vertical portion and being securely mounted on said horizontal portion about its rotational connection to said support means whereby said pawl means and vertical portion simultaneously rotate in the same direction upon rotation of said L-shaped arm about said support means, and
   biasing means having a first end pivotally connected to said support means and a movable end engaging the horizontal portion of said arm to normally urge said pawl means into contact with said device at predetermined positions of said L-shaped arm,
   the movable end on said vertical portion of said arm responsive to centrifugal force rotatable against the urging of said biasing means.

2. The arm means of claim 1 in which said pawl means comprises a plurality of pawls extending from said rotational connection to said support means, said pawls having bearing surfaces each adapted to cooperatively engage said device as it rotates at a predetermined position of said arm.

3. The arm means as defined in claim 1 wherein said biasing means is a spring concentrically disposed within a generally cylindrical housing, said housing being fixedly attached to said support means.

4. In a rotor assembly having a rotating drive shaft, a gimbal hub attached to said drive shaft and rotor blades attached to said gimbal hub, an anti-torque lock arm comprising:
a support frame fixed attached to the drive shaft and extending outwardly therefrom;
a generally L-shaped beam having a pivotally retained end an movable end, said beam being rotatably connected at said retained end to said support frame;
a pawl extending from said pivotally retained end of said L-shaped beam and having at least two bearing surfaces, said pawl surfaces being adapted to selectively engage the surfaces of said gimbal hub at predetermined positions of said generally L-shaped beam; and
biasing means proximate said support frame and having a longitudinal axis approximately normal to the axis of said drive shaft, said biasing means adapted to engage the pivotally retained end of said generally L-shaped beam and to bias said movable end inwardly;
said movable end of said generally L-shaped beam being adapted to respond to centrifugal force by moving outwardly against the action of said biasing means.

5. A rotor and anti-torque lock assembly comprising:
a rotor member, including a gimballed hub, to be locked;
a drive shaft connected to said rotor member for driving the same in rotation;
a support frame, fixed attached to said drive shaft and extending outwardly therefrom;
a generally crank-shaped member having a first end pivotally attached to said support frame, and an oscillating end;
a double pawl integral with and extending from a position adjacent the first end of said crank-shaped member, said double pawl having at least two bearing surfaces at two different positions relative to said rotor member, each adapted to contact said gimballed hub and restrain its angular movement relative to said drive shaft at a predetermined rotary speed of said assembly;
a weight fixed to the oscillating end of said crank-shaped member for causing said crank-shaped member to respond to centrifugal force by moving outwardly away from said gimballed hub; and
biasing means connected to said support frame and extending into engagement with said crank-shaped member, for urging said crank-shaped member and said bearing surfaces of said pawl toward said rotor member at predetermined values of centifugal force.

6. The apparatus as defined in claim 5 wherein said bearing surfaces of said pawl have imposed upon them a resilient impact resistant coating.

References Cited

UNITED STATES PATENTS

| | | | |
|---|---|---|---|
| 2,396,038 | 3/1946 | Bossi | 244—17 |
| 2,465,674 | 3/1949 | Crowell | 170—160.55 XR |
| 2,471,681 | 5/1949 | Gluhareff | 170—160.55 |
| 2,481,747 | 9/1949 | Hiller | 170—160.55 |
| 2,614,640 | 10/1952 | Buivid | 170—160.55 |
| 2,717,653 | 9/1955 | Emmerson | 170—160.55 |
| 2,928,478 | 2/1960 | Du Pont | 170—160.55 |

FOREIGN PATENTS 958,536  5/1964  Great Britain.

EVERETTE A. POWELL, JR., Primary Examiner

U.S. Cl. X.R.

416—148